United States Patent
Underwood et al.

(10) Patent No.: US 12,056,044 B2
(45) Date of Patent: Aug. 6, 2024

(54) MECHANISM TO REPRESENT DATA STRUCTURES FOR A DATATYPE ENGINE AND PROVIDE INLINE COMPACTION

(71) Applicant: Hewlett Packard Enterprise Development LP, Houston, TX (US)

(72) Inventors: Keith D. Underwood, Powell, TN (US); Robert L. Alverson, Seattle, WA (US); Christopher Michael Brueggen, Allen, TX (US)

(73) Assignee: Hewlett Packard Enterprise Development LP, Spring, TX (US)

(*) Notice: Subject to any disclaimer, the term of this patent is extended or adjusted under 35 U.S.C. 154(b) by 35 days.

(21) Appl. No.: 17/976,730

(22) Filed: Oct. 28, 2022

(65) Prior Publication Data

US 2024/0143494 A1    May 2, 2024

(51) Int. Cl.
*G06F 3/06*     (2006.01)
*G06F 12/02*    (2006.01)

(52) U.S. Cl.
CPC ........ *G06F 12/0207* (2013.01); *G06F 3/0604* (2013.01); *G06F 3/0659* (2013.01); *G06F 3/0673* (2013.01); *G06F 2212/1016* (2013.01)

(58) Field of Classification Search
CPC .. G06F 12/0207; G06F 3/0604; G06F 3/0659; G06F 3/0673; G06F 13/14; G06F 13/28
USPC ................. 710/22, 62, 68; 711/154
See application file for complete search history.

(56) References Cited

U.S. PATENT DOCUMENTS

| | | | |
|---|---|---|---|
| 6,789,128 B1 * | 9/2004 | Harrison | H04L 67/60 707/999.203 |
| 6,820,264 B1 | 11/2004 | Bashkansky et al. | |
| 7,089,391 B2 | 8/2006 | Geiger et al. | |
| 9,569,391 B2 | 2/2017 | Bubb et al. | |
| 9,575,765 B2 | 2/2017 | Forsyth et al. | |
| 9,778,858 B1 | 10/2017 | Prasad et al. | |
| 2013/0166793 A1 * | 6/2013 | Shahar | G06F 13/28 710/26 |
| 2019/0370199 A1 | 12/2019 | Tomlin | |
| 2021/0366177 A1 * | 11/2021 | Viitanen | G06T 1/20 |

* cited by examiner

*Primary Examiner* — Ilwoo Park
(74) *Attorney, Agent, or Firm* — Yao Legal Services, Inc.

(57) ABSTRACT

A system, method, and apparatus are provided to facilitate data structures for a datatype engine and provide inline compaction. The system receives, by a network interface card (NIC), a command to read data from a host memory, wherein the command indicates a datatype. The system generates a plurality of read requests comprising offsets from a base address and corresponding lengths based on the datatype. The system issues the plurality of read requests to the host memory to obtain the data from the host memory. The system obtains a byte-mask descriptor corresponding to the datatype. The system performs, based on the obtained data and the byte-mask descriptor, on-the-fly compaction of the obtained data, thereby allowing the NIC to return a requested subset of the obtained data.

20 Claims, 8 Drawing Sheets

210 {
```
MPI_Type_contiguous(3, MPI_FLOAT,
    &su3_vector_mpi_t);
```

212 {
```
MPI_Type_vector(squaresize[TUP],
    squaresize[XUP]*squaresize[YUP]/2,
    squaresize[XUP]*squaresize[YUP]
        *squaresize[ZUP]/2,
    su3_vector_mpi_t,
    &field_neighbor_ddt[0][0][ZUP]);
```

214 {
```
MPI_Type_vector(
    squaresize[ZUP]*squaresize[TUP],
    squaresize[XUP]/2,
    squaresize[XUP]*squaresize[YUP]/2,
    su3_vector_mpi_t,
    &field_neighbor_ddt[0][0][YUP]);
```

216 {
```
MPI_Type_vector(squaresize[YUP]
    *squaresize[ZUP]
    *squaresize[TUP]/2, 1,
    squaresize[XUP]/2,
    su3_vector_mpi_t,
    &field_neighbor_ddt[0][0][XUP]);
```

```
struct element {
  int a;
  float b;
  uint8_t c;
  double d;
};
struct element AoE[80][100][200];
int x, y, z;

//Send face yx
for(y=0; y < 100; y++)
  for(x=0; x< 200; x++) {
    send(AoE[0][y][x].b);
    send(AoE[0][y][x].d);
  }

//Send face zy
for(z=0; z< 80; z++)
  for(y=0; y < 100; y++) {
    send(AoE[z][y][0].b);
    send(AoE[z][y][0].d);
  }

//Send face zx
for(z=0; z< 80; z++)
  for(x=0; x< 200; x++) {
    send(AoE[z][0][x].b);
    send(AoE[z][0][x].d);
  }
```

//Send face zx (unrolled version 2 blocks at a time)
for(z=0; z< 80; z++)
  for(x=0; x< 200; x+2) {
    send(AoE[z][0][x].b);
    send(AoE[z][0][x].d);
    send(AoE[z][0][x+1].b);
    send(AoE[z][0][x+1].d);
  }
```

… # MECHANISM TO REPRESENT DATA STRUCTURES FOR A DATATYPE ENGINE AND PROVIDE INLINE COMPACTION

STATEMENT OF GOVERNMENT-FUNDED RESEARCH

This invention was made with Government support under Contract Number H98230-23-C-350 awarded by the Maryland Procurement Office. The Government has certain rights in this invention.

BACKGROUND

Field

User applications may send data which resides in non-contiguous buffers. Similarly, these user applications may receive data into non-contiguous buffers. In traditional systems, a typical flow can involve copying or packing the data into a contiguous send buffer, transferring the data, and copying or unpacking the data from a contiguous receive buffer into the appropriate application locations. These data copy operations (i.e., the pack and unpack) occur in software and are thus serialized with the data transfer communications, which can significantly extend the communication time. Furthermore, a user may wish to transmit only a subset of data elements which are laid out in an "array of structures" format. Transmitting only the subset may result in inefficient data accesses from a high bandwidth network interface card (NIC).

BRIEF DESCRIPTION OF THE FIGURES

In the figures, like reference numerals refer to the same figure elements.

DETAILED DESCRIPTION

The following description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

User applications may send data which resides in non-contiguous buffers. Similarly, these user applications may receive data into non-contiguous buffers. In traditional systems, a typical flow can involve copying or packing the data into a contiguous send buffer, transferring the data, and copying or unpacking the data from a contiguous receive buffer into the appropriate application locations. These data copy operations (i.e., the pack and unpack) occur in software and are thus serialized with the data transfer communications, which can significantly extend the communication time. Furthermore, a user may wish to transmit only a subset of data elements which are laid out in an "array of structures" format. Transmitting only the subset may result in inefficient data accesses from a high bandwidth network interface card (NIC).

Current software interfaces may allow a user to express the data layout in its native form. One commonly used software interface is the Message Passing Interface (MPI), in which a user can provide a base address to start a transfer and a datatype to apply to that transfer. MPI also provides a mechanism called "derived datatypes," which can describe the data layout in host memory and use that description for certain MPI calls (e.g., MPI_Send and MPI_Recv). Historically, using derived datatypes in MPI can result in poor performance, because the library must interpret the description in order to perform copies in to and out of an internal buffer for the MPI_Send and the MPI_Recv commands, respectively. As a result, the pack and unpack operations are still performed in software and still serialized with the communications, which can result in inefficiencies in the overall performance of data-related operations, such as data gather/scatter operations.

The described aspects provide a system which addresses these issues, by providing a datatype engine (DTE) in hardware which performs the gather/scatter operations, thus eliminating the inefficient data copies used in the prior software solutions. The datatype engine can reside in the network interface card (NIC) or an application-specific integrated circuit (ASIC) of the NIC, including as part of an outbound packet engine and an inbound packet engine. The datatype engine can generate a series of addresses and lengths based on a datatype descriptor. The datatype descriptor can be an input/output vector (IOVEC) structure with relative addressing and can describe a multi-dimensional array defined with a count, a block size, and a stride. By using the datatype descriptor as part of the data path, the datatype engine in both the transmit path (e.g., handling read operations from host memory by the outbound packet engine) and the receive path (e.g., handling write operations to host memory by the inbound packet engine) can result in reducing the communication time involved with data transfer over a network. This can result in a more efficient transfer of messages between network entities, which can in turn result in a more efficient use of resources, e.g., to support high performance computing.

The described aspects of the datatype engine can perform gather/scatter operations while addressing several challenges. One challenge is ensuring that the representation of a datatype covers common use cases while remaining compact. This may be difficult when dealing with codes which build arrays of structures. The described aspects can represent a datatype with three strides, three counts, and a representation of a base block. The system can represent the base block using a length, a valid number of bytes, and a bit mask (e.g., a 256-bit "byte-mask" as described below in relation to FIGS. 5 and 6) to indicate which bytes are valid. This datatype can represent an arbitrary three-dimensional (3D) array of C structures (up to 256 bytes per structure) using less than 64 bytes of storage for each datatype.

Another challenge involves the use of redundant memory resources as part of compaction. Reading data from memory and placing the read data into a temporary local buffer before compacting the valid bytes may require redundant memory resources. Current solutions may involve allocating a buffer, placing the result of the read into the buffer, and then compacting the data, which may result in an inefficient use of memory resources. The described aspects address this challenge by compressing 256 bytes with a 256-bit byte-mask to capture only the valid bytes in eight stages of 2 to 1 multiplexers. The system can further leverage the population count (i.e., "POPCNT") instruction found in most processors to quickly and efficiently encode additional information to reduce the amount of logic needed for each stage of the compaction. A detailed description of a compaction module in an outbound transfer engine of a NIC is provided below in relation to FIGS. 5 and 6.

In addition to addressing these challenges to improve the performance of data transfers across a network and to support high performance computing, the described system can include other aspects. One aspect can involve the ordering of datatype commands (e.g., installing a datatype descriptor in a DTE of a NIC) relative to payload commands (e.g., performing a user read/write command). A datatype must be created and setup or installed prior to being used by a payload or user command. Commands may travel through the NIC via multiple paths, e.g., based on a series of parallel queues. The system can select the queue by performing a hash of various fields in a command or associated packet. As a result, both the command to install a datatype descriptor into the DTE of the NIC and the user command can have a flow hash which enables the two commands to take the same path. Furthermore, the system can include an event which indicates that a datatype command has completed, as shown in the communications with the event engine depicted below in relation to FIG. 1. Once the datatype command has completed, the installed datatype descriptor can be used by many independent subsequent commands.

Another aspect of the described system can involve datatype selection and storage efficiency. A command to begin a new message must indicate the datatype that it wishes to use. However, including a full datatype descriptor with each command may not be efficient or practical. In addition, datatypes may be frequently structured the same between processes on a given node which are part of the same user job. The described aspects can include an allocation mechanism for datatypes which can result in improving the storage efficiency as well as the efficiency of new message commands. The software, e.g., the operating system (OS), can allocate datatype storage space and provide a datatype key to the user. The system may use a single key space for datatype descriptors, which single key space can be shared between processes. The hardware can provide an enforcement mechanism which ensures that only processes that are part of the same application can use a given key. The user can include the given key in a new message to specify which datatype to use. The system can use a null entry for the datatype key to indicate that a command or transfer does not include a datatype.

Yet another aspect of the described system can relate to the use of both absolute and relative addressing in the IOVEC structure used by the datatype engine. Prior solutions can use absolute addressing in a gather/scatter list to support use cases involving the OS kernel-mode. However, the interface for user level software generally uses relative addressing, which can create limitations when using gather/scatter engines by the MPI. In using the IOVEC structure in the described aspects, the DTE can retrieve data from host memory based on a list of addresses and lengths using two different modes of addressing. The first mode is absolute addressing, in which the addresses retrieved from host memory are the virtual addresses to be used, i.e., using a set of absolute address/length pairs in an IOVEC. The second mode is relative addressing, in which the addresses retrieved from host memory are used as offsets from the base virtual address provided by the user in a new message, where the offset can be obtained from an IOVEC (list of offsets and lengths) or from a datatype descriptor.

Another aspect of the described system involves the efficiency of datatype storage, IOVECs, and commands. In order to start a new message, prior solutions can add a pointer to an IOVEC to each command, which can result in increasing the size of the command and decreasing the efficiency of the command interface. The system can encode and setup or install IOVECs in the same way as other datatypes. However, some IOVEC use cases may be used only once, i.e., the system creates the IOVEC, uses it for one command ("use once"), and discards it. Because the command ordering works in collaboration with the IOVEC approach, the command ordering logic described above can allow the system to maintain existing command formats while still ensuring an efficient setup path for these "use once" IOVECs.

Thus, aspects of the described system can address the above-described challenges by providing a datatype engine (DTE) which generates a series of addresses and lengths based on a datatype descriptor. The datatype descriptor can be an IOVEC structure with relative addressing and can describe a multi-dimensional array defined with a count, a block size, and a stride, as described below in relation to FIG. 2. An overall architecture of a system (e.g., a NIC) which includes an outbound transfer engine and an inbound transfer engine is described below in relation to FIG. 1, while a detailed diagram of an outbound transfer engine with a DTE module in communication with other modules is described below in relation to FIG. 3.

Aspects of the described system can also provide a compaction module in the outbound transfer engine of the NIC. The compaction module can provide inline compaction of requested read data by utilizing a byte-mask as well as the currently existing software instruction POP_CNT to provide the inline (i.e., "on-the-fly") compaction, as described below in relation to FIGS. 5 and 6. The utilized byte-mask can be any number of bits, e.g., a 128-bit byte-mask, a 256-bit byte-mask, or a 512-bit-byte-mask. While the examples described herein use a 256-bit byte-mask, the byte-mask is limited to neither 256 bits nor to a number of bits which is a power of 2. A number of stages required to compact data using the byte-mask can be determined as a logarithmic function (log base 2) of the number of bits in the byte-mask, as described below in relation to FIGS. 5 and 6.

Thus, by representing data structures using datatypes in a datatype engine, and by providing inline compaction based on a byte-mask and population counts, the described aspects can provide a system which addresses the above-described challenges, including the inefficient data copies as well as the use of redundant memory resources to perform compaction. Furthermore, the system can provide a mechanism for the hardware to read a block using a single read and transmit only the desired bytes (e.g., a subset of the elements that a user wishes to send), which can result in more efficient transfers across the host bus (e.g., a Peripheral Component Interconnect Express (PCIe) bus)) than can be achieved by issuing multiple independent reads.

The terms "datatype" and "datatype descriptor" are used interchangeably in this disclosure and refer to a description of a multi-dimensional array defined with a count, a block size, and a stride. The structure of the multi-dimensional array can be parameterized by up to three dimensions and a base element structure which can span up to 256 bytes. In some aspects, a higher dimensionality may be used and the base element structure may span up to a different number of bytes.

The terms "datatype engine," "DTE"," "datatype engine module," and "datatype engine unit" are used interchangeably in this disclosure and refer to a unit, module, or component that resides in a NIC or in a NIC ASIC. The datatype engine can reside in both an outbound packet engine and an inbound packet engine of the NIC. The datatype engine can use certain parameters to describe the multi-dimensional array (i.e., the datatype descriptor) in host memory.

The terms "units" and "modules" are used interchangeably in this disclosure and refer to a physical or logical component or grouping of operations performed by hardware, as described herein.

The terms "bit mask," "byte-mask" and "byte-mask descriptor" as used interchangeably in this disclosure and refer to a value with a number of bits that can be used as a byte-mask on data of up to a predetermined number of bytes. Each bit in an X-byte-mask can correspond to a byte in a X-byte chunk or block of data. The size X of the byte-mask can be any number of bits (such as 128, 256, or 256) and the size X or predetermined number of bytes of the data is not limited to a value of the power of 2. Furthermore, the logarithmic relationship between the number of bits in the byte-mask and the number of stages required to compact the data is described below in relation to FIGS. 5 and 6. Some of the disclosed aspects use a 256-bit byte-mask and a 256-byte chunk or block of data for illustrative purposes.

Exemplary High-Level Architecture

Figure 1:
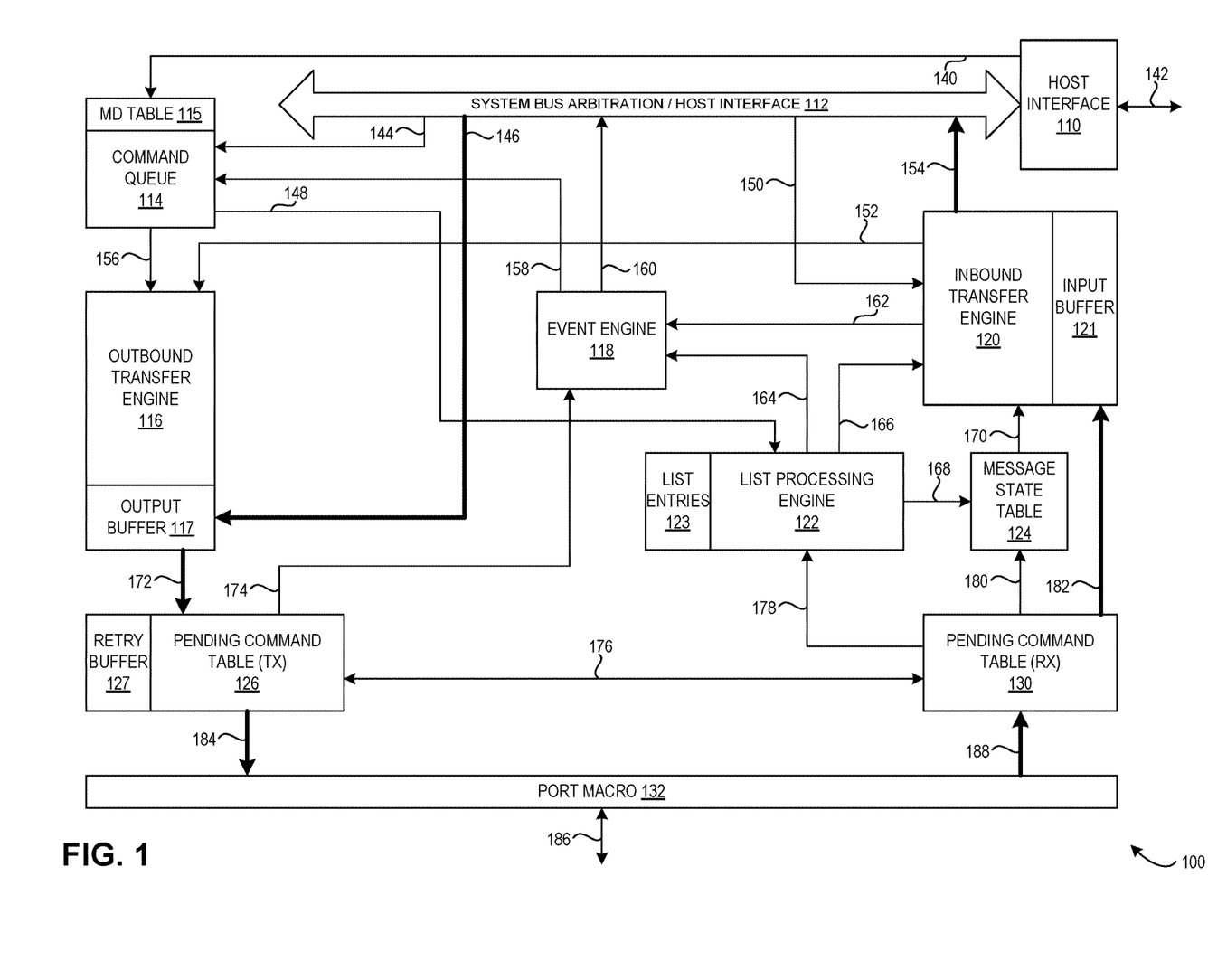
FIG. 1 illustrates a diagram of an architecture which facilitates data structures for a datatype engine and provides inline compaction, in accordance with an aspect of the present application.

FIG. 1 illustrates a diagram 100 of an architecture which facilitates a datatype engine to support high performance computing, in accordance with an aspect of the present application. Diagram 100 can depict a network interface card (NIC), which includes various components or modules, as well as interfaces and communications. On one of the NIC, a host interface 110 exists between components of the NIC and a host. Host interface 110 can handle communications with the host (via a communication 142). On the other end, a port macro 132 exists between the NIC components and a network, and can handle communications with the network (via a communication 186). In general, components on the left side of diagram 100 pertain to an outbound path and can process transmit operations related to performing read operations from host memory (indicated by the bold-lined communications of 146, 172, and 184, described below), while components on the right side of diagram 100 pertain to an inbound path and can process receive operations related to performing write operations to host memory (indicated by the bold-lined communications of 188, 182, and 154).

Host interface 110 can receive data from the various NIC components via a system bus arbitration/host interface 112. Host interface 110 can also send a command list pointer or a command with data to a command queue 114 (via a communication 140), which can include a metadata (MD) table 115. Command queue 114 can send portal and Ethernet operations (e.g., relating to read operations in the transmit path) to an outbound transfer engine 116 (via a communication 156), which can include an outbound buffer 117 for storing data relating to operations performed by outbound transfer engine 116. Command queue 114 can also receive commands related to reading data, e.g., a direct memory access (DMA) fetch command (via a communication 144) as well as events from an event engine 118 (via a communication 158). Command queue 114 can also transmit append commands to a list processing engine 122 (via a communication 148).

Outbound transfer engine 116 can include an instance of a datatype engine (not shown in FIG. 1) and can perform various operations to generate requests or commands relating to read DMA operations. Outbound transfer engine 116 can receive outbound DMA data from host memory (via a communication 146 from host interface 112), which data can be stored in output buffer 117. A detailed description of outbound transfer engine 116 is provided below in relation to FIG. 3.

Subsequent to the datatype engine of outbound transfer engine 116 using an IOVEC with relative addressing and describing a multi-dimensional array in the manner described herein, outbound transfer engine 116 can output the requests or commands to a pending command table (transmit (TX)) 126 (via a communication 172). Pending command table 126 can include a retry buffer 127. Pending command table 126 can send a completion notification to event engine 118 (via a communication 174) upon completing a respective command. Pending command table 126 can transmit outbound packets corresponding to read commands (via a communication 184 to port macro 132).

The NIC can receive inbound packets to be written to host memory (via a communication 188). The inbound packets can be transmitted to a pending command table (receive (RX)) 130. Pending command table 130 can subsequently send information to a message state table 124 (via a communication 180) and a message to list processing engine 122 (via a communication 178), which can include list entries 123. List processing engine 122 can send information to message state table 124 (via a communication 168), which can send information to an inbound transfer engine 120 (via a communication 170). Inbound transfer engine 120 can include an input buffer 121. List processing engine 122 can also send a memory or datatype descriptor to inbound transfer engine 120 (via a communication 166) to be stored in a datatype engine (not shown) of inbound transfer engine 120. List processing engine 122 can further send events to event engine 118 (via a communication 164). Pending command table 130 can also transmit to inbound transfer engine 120 a payload associated with the inbound packets (via a communication 182), which payload can be stored in input buffer 121. Inbound transfer engine 120 can include an instance of a datatype engine (not shown in FIG. 1) and can perform various operations to generate requests or commands relating to write DMA operations. Subsequent to the datatype engine of inbound transfer engine 120 using an IOVEC with relative addressing and describing a multi-dimensional array in the manner described herein, inbound transfer engine 120 can transmit inbound DMA data to host memory (via a communication 154 to host interface 112).

Inbound transfer engine 120 can receive data from host interface 112 (via a communication 150) and can also send a completion notification to event engine 118 (via a communication 162) upon completing a respective command. In addition to receiving completions from pending command table 126 and inbound transfer engine 120 (via, respectively, communications 174 and 162), event engine 118 can send event-related information to host interface 112 (via a communication 160). The pending command tables in the transmit and receive paths can communicate a response state (tables 126 and 130 via a communication 176), and inbound transfer engine 120 can also transmit replies to outbound transfer engine 116 (via a communication 152). In the same way that outbound transfer engine 116 can form a packet and that the DTE of outbound transfer engine 116 can form a plurality of reads, list processing engine 122 can form an address for writing a packet and pass that address to the DTE of inbound transfer engine 120. The DTE of inbound transfer engine 120 can form a plurality of write requests comprising offsets from that address and corresponding lengths based on a given datatype descriptor. It would be obvious to anyone skilled in the practice of the art that this mechanism could be employed on the input processing of a packet as well.

Overview of Datatype Descriptors

In a typical NIC implementation, user software can supply a command which indicates a virtual address and a length of data to be transferred. The NIC can receive the command and translate the virtual address. Subsequently, the NIC can issue reads to the host memory (for transmitting data, e.g., in a Get operation) or writes to the host memory (for receiving data, e.g., in a Put operation). In conventional solutions, these issued reads and writes to the host memory are generally for large blocks of contiguous data.

The described aspects provide a datatype engine which generates a series of addresses and lengths based on a datatype or a "datatype descriptor." Datatypes can natively express data layouts in application memory, which can result in eliminating the resource-consuming copies. That is, a datatype is a way to describe the native data layout in memory. Without a datatype descriptor as described herein, central processing units (CPUs), general processing units (GPUs), and advanced memory systems are used to perform the described data copies. However, because operations using these systems can be expensive (i.e., general, CPUs, GPUs, and advanced memory systems are better suited for other work), using these systems may be inefficient.

A datatype descriptor can take two forms. A first form is a multi-dimensional array descriptor, in which the datatype engine uses parameters to describe an array in host memory, as described below in relation to the matrix transpose example of FIG. 4. The multi-dimensional array can include: a number of elements in each dimension; a size of a block to be transferred; and a stride in each dimension. The datatype descriptor can also include a handle to the old datatype name and the new datatype name, as described below in relation to FIGS. 2 and 4. A second form is an input/output (I/O) vector (IOVEC), in which the DTE retrieves a list of addresses from host memory. The IOVEC can use either relative addressing or absolute addressing. In relative addressing, the DTE can retrieve data based on addresses which are "offsets" from a base virtual address provided by a user, while in absolute addressing, the DTE can retrieve data based on addresses which are the virtual addresses to be used.

Exemplary Code for Application Using Datatypes

Figure 2:
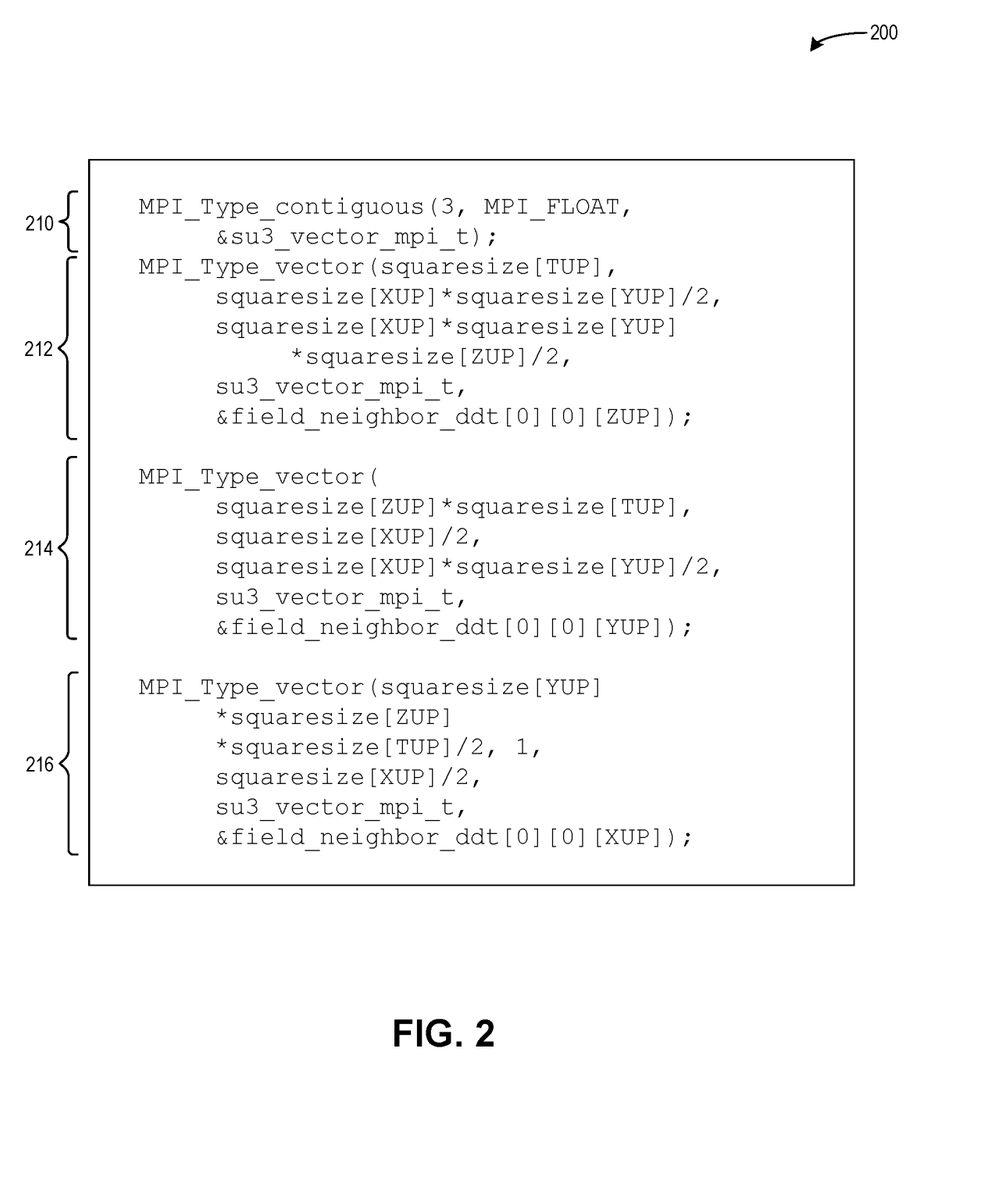
FIG. 2 illustrates an exemplary code excerpt for an application using datatypes, in accordance with an aspect of the present application.

FIG. 2 illustrates an exemplary code excerpt 200 for an application using datatypes, in accordance with an aspect of the present application. A section 210 can indicate a datatype "MPI_Type_contiguous" which allows replication of a datatype into contiguous locations. Sections 212, 214, and 216 can indicate a datatype "MPI_Type_vector" which allows replication of a datatype into locations with equally spaced blocks, where each block can be obtained by concatenating the same number of copies of the old datatype. The space between the blocks can be a multiple of the extent of the old datatype. The "MPI_Type_vector" can indicate a structure comprising a multi-dimensional array which includes: a count corresponding to a number of blocks or elements in each dimension; a block size or length corresponding to a number of elements in each block; a stride in each dimension, corresponding to a number of elements between the start of each block; an indicator of an existing or an old datatype; and a handle to a new datatype.

Section 210 can create a three element vector of floats and be used to construct descriptions of multiple faces (e.g., three) of a matrix. Using the datatype indicated in sections 214 and 216 can result in transmitting data in large chunks or many large chunks, which chunks can be aggregated up to a message and can result in an efficient transfer. However, using the datatype indicated in section 212 can result in performing a gather/scatter of 12 bytes from many locations, which may not be as efficient as using the datatype of sections 214 and 216. In comparing the NIC performance against the performance of CPUs and GPUs, the datatype engine in the NIC with datatype descriptors can perform more efficiently when transferring data in larger chunks (e.g., 128 byte segments) rather than in smaller chunks (e.g., 8 byte or 12 byte segments).

Another datatype that can be created using the MPI standard is a datatype "MPI_Type_indexed," which can build a structure that is similar to a traditional scatter/gather list. In some aspects of the described system, a user can create the "indexed" datatype and generate an MPI_Send command using the created "indexed" datatype, including a series of offsets from an address. This relative addressing is described below in relation to FIG. 3. Furthermore, a bit mask (i.e., a byte-mask) can be applied to each element in this created list, which allows an application to provide a list of pointers to structures in which only certain sub-elements of the structures will be transmitted. A 256-bit byte-mask used by a compaction module in an outbound packet engine of a NIC is described below in relation to FIGS. 5 and 6.

Furthermore, the array representation described herein can cover the most common types used in applications, namely, one-dimensional (1D), two-dimensional (2D), and three-dimensional (3D) arrays. For each dimension, the described aspects can provide a number of elements and a stride between the elements. Because a typical application may only send each "face" of a larger matrix, the described array representation can cover the 1D faces of a 2D matrix, the 2D faces of a 3D matrix, and the 3D faces of a 4D matrix. While the described aspects are depicted in terms of covering up to a 4D matrix, the system can be extended to cover higher dimensions.

Outbound Packet Engine and the Transmit Path

Figure 3:
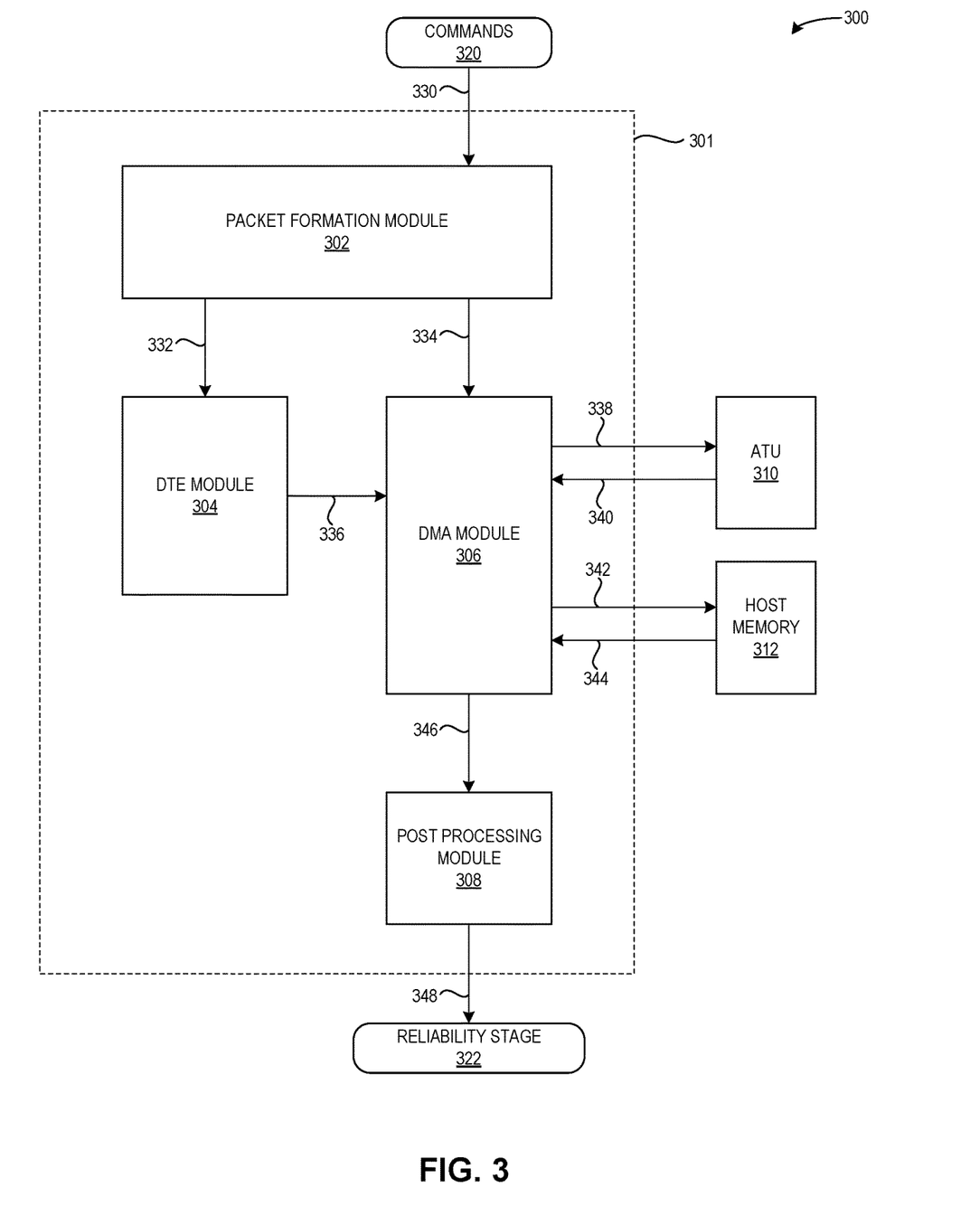
FIG. 3 illustrates a diagram of an outbound packet engine with a datatype engine as part of the transmit path, in accordance with an aspect of the present application.

As described above in relation to FIG. 1, the datatype engine can be integrated with both the transmit and the receive logic in, respectively, the outbound packet engine and the inbound packet engine. FIG. 3 illustrates a diagram 300 of an outbound packet engine 301 with a datatype engine as part of the transmit path, in accordance with an aspect of the present application. Outbound packet engine (OXE) 301 can include: a packet formation module 302; a datatype engine (DTE) module 304; a direct memory access (DMA) module 306; and a post processing module 308. OXE 301 can take as input data from commands 320 and can output data packets to a reliability stage 322. In addition, OXE 301 can communicate with an address translation unit (ATU) 310 and a host memory 312.

During operation, OXE 301 can receive a command, e.g., from a command queue of commands 320 (via a communication 330). The command can be received via a message passing interface (MPI) and can be a command to read data from a host memory. In a standard path (i.e., where the datatype descriptor is not present and thus bypassing the DTE), packet formation module 302 can form a packet which indicates a header, an address, and a length associated with the data to be read from the host memory, referred to as a "non-DTE DMA command." This standard non-DTE DMA command can be sent to DMA module 306 (via a communication 334). DMA module 306 can retrieve the corresponding address translations from ATU 310, e.g., by sending a virtual address 338 to ATU 310 and receiving a physical address 340 from ATU 310. DMA module 306 can subsequently issue one or more read requests to host memory 312 (via a communication 342) and receive the corresponding one or more read responses from host memory 312 (via a communication 344). DMA module 306 can transmit the read responses to post processing module 308 (via a communication 346), which processed data can be transmitted as output to reliability stage 322 (via a communication 348).

In the case where the datatype descriptor is present (e.g., indicated as a handle to a previously stored datatype descriptor) in the command, packet formation module 302 can form a packet which indicates or references the datatype descriptor as well as a base address and a length associated with the data to be read from the host memory, referred to as a "DTE command." This DTE command can be sent to DTE module 304 (via a communication 332). DTE module 304 can identify or determine that the datatype descriptor indicated in the packet matches a datatype descriptor stored in DTE module 304, e.g., as previously configured and stored by a user. Using the identified matching datatype descriptor, DTE module 304 can generate a plurality of read requests with offsets from the base address and corresponding lengths. DTE module 304 can subsequently transmit these generated read requests to DMA module 306 (as DMA commands via a communication 336). DMA module 306 can perform the address translation (if needed) and the read retrieval operations described above in relation to communications 338, 340, 342, and 344 as well as the subsequent operations relating to post processing module 308 and reliability stage 322.

Exemplary Array of Elements and Optimization for Data Transfer

Figure 4A:
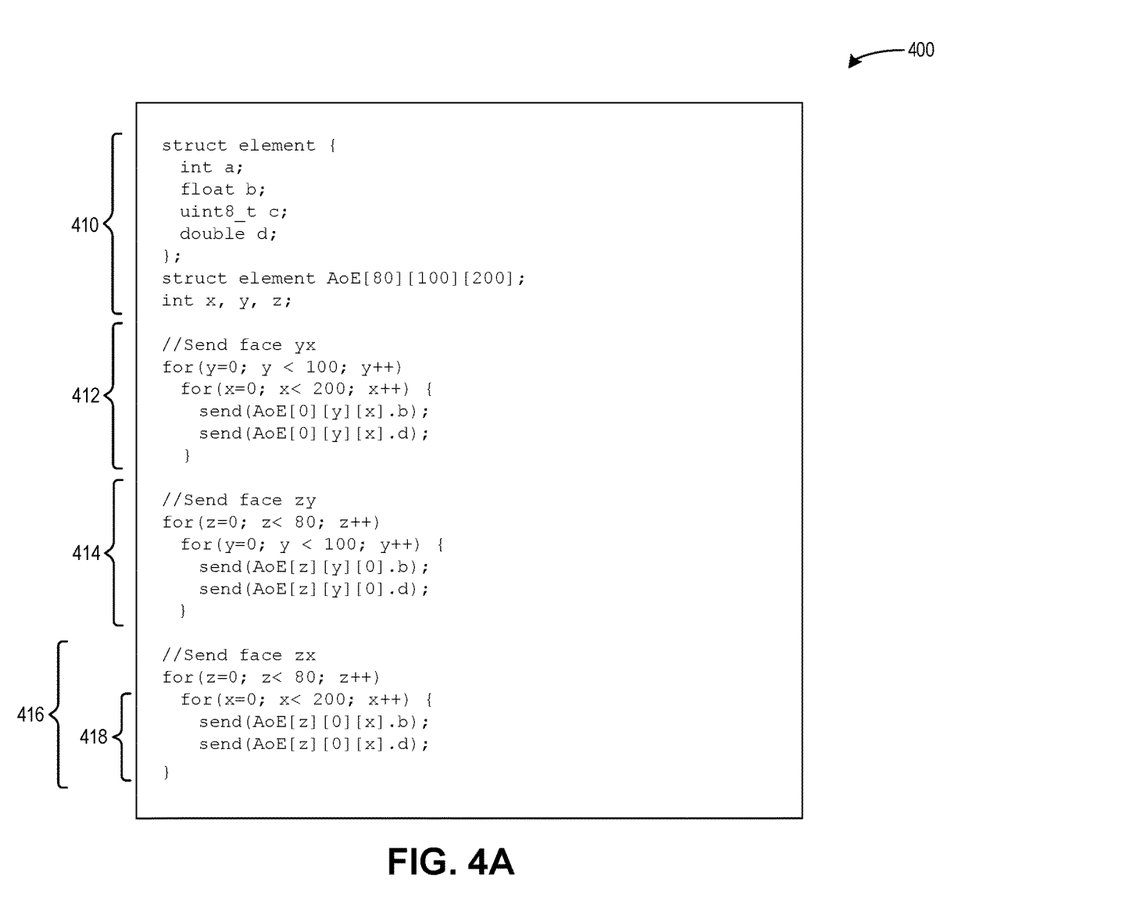
FIG. 4A illustrates an exemplary code excerpt to send a subset of elements which are defined in an array of structures format, in accordance with an aspect of the present application.

FIG. 4A illustrates an exemplary code excerpt 400 to send a subset of elements which are defined in an array of structures format, in accordance with an aspect of the present application. A section 410 can define a data structure (named "element") of four elements including: an integer "a" (of 4 bytes); a float "b" (of 4 bytes); an unsigned integer "c" (of 8 bytes); and a double type "d" (of 8 bytes). Thus, the total size of all the elements in this data structure is 24 bytes. Section 410 can also define an array of the data structure "elements" (named "AoE" or array of elements) of three dimensions, with sizes of 80, 100, and 200, and can further define three integers x, y, and z as corresponding to the faces of the array of elements.

Sections 412, 414, and 416 can indicate code for sending a subset of the elements of each of the three faces. For example, assume that a request to read data is only to read or send the elements "b" and "d" of each face. Each section includes nested iterations or loops which each walk through one of the two arrays corresponding to each face, where each iteration or loop specifically sends the exact element b or d which is desired to be read. For example, section 416 indicates code to send the b and d elements of face "zx," where the code walks through an outer loop of z from 0 to 80 with an inner loop of x from 0 to 200 (as indicated by a section 418).

One aspect of the described system can provide an optimization which takes advantage of data that is laid out linearly in memory. In general, many cells are less than 256 bytes in length and the hardware can represent data up to 256 bytes. The optimization allows the system to unroll a loop (e.g., an inner loop such as the one indicated by section 418) into some number of "smaller-sized" elements which will fit into, e.g., a 256-byte chunk. Thus, in the example of FIG. 4, where each such smaller-sized element is 24 bytes, the system can unroll 10 of these 24-byte elements into one large 240-byte chunk, which can thus be read as a single 240-byte chunk. Reading a single 240-byte chunk once versus reading 10×24-byte chunks over a host interface can result in reducing traffic over the host interface, which can result in a more efficient read operation.

Figure 4B:
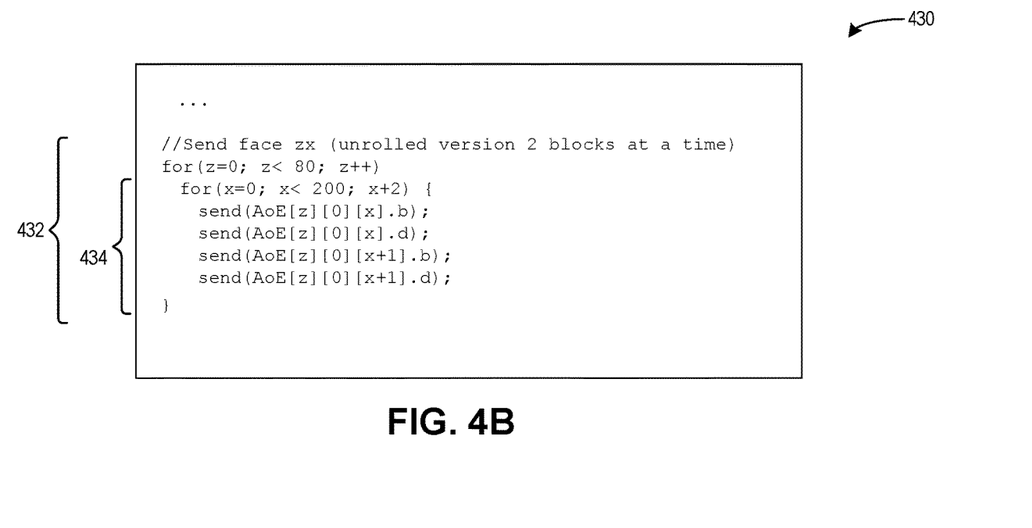
FIG. 4B illustrates an exemplary code excerpt to optimize sending a subset of elements which are defined in an array of structures format, in accordance with an aspect of the present application.

As an example, assume that the elements described by AoE in face zx are adjacent to each other in memory. The system can unroll two of these 24-byte elements at one time. The resulting updated code for this inner loop is depicted in FIG. 4B. FIG. 4B illustrates an exemplary code excerpt 430 to optimize sending a subset of elements which are defined in an array of structures format, in accordance with an aspect of the present application. A section 432 can correspond to section 416 of FIG. 4A, and a section 434 can correspond to an updated inner loop. Section 432 indicates code to unroll inner loop 418 of FIG. 4A such that the data is now read two blocks at a time, as indicated by "x+2" and the additional two "send" lines in section 434. Thus, instead of having a block size of 24 bytes (as in the case with the array structure defined in FIG. 4A), the system can now use a block size of 48 bytes as the obtained returned data. The system can also replicate the 24-bit byte-mask to obtain a 48-bit byte-mask which can be used to perform compaction of the returned corresponding 48 bytes of data.

As can be seen by FIG. 4B, unrolling the loop such that a maximum size does not exceed 256 bytes can provide an optimization to the data transfer process, as the transfer of one larger size chunk of data (e.g., 48 bytes when unrolled two times or 240 bytes when unrolled 10 times) over the host interface can be more efficient than multiple smaller-sized elements (e.g., 10×24-byte chunks of data).

Outbound Packet Engine with Compaction Module

Figure 5:
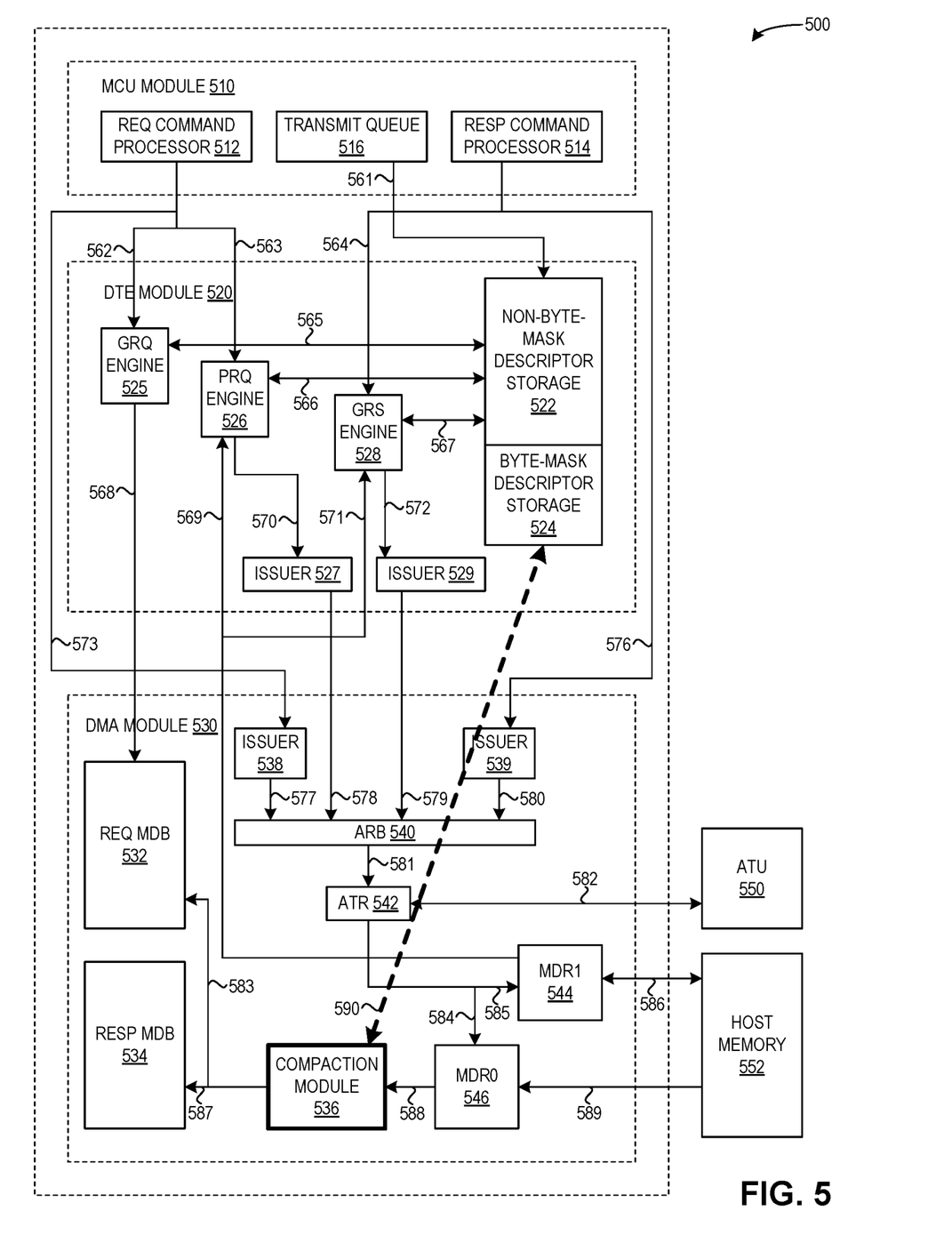
FIG. 5 illustrates a diagram depicting a high-level view of an outbound packet engine, including the datatype engine and storage of non-byte-mask descriptors and byte-mask descriptors, in accordance with an aspect of the present application.

FIG. 5 illustrates a diagram 500 depicting a high-level view of an outbound packet engine (OXE), including the datatype engine and storage of non-byte-mask descriptors and byte-mask descriptors, in accordance with an aspect of the present application. Diagram 500 can include a message chopping unit (MCU) module 510, a datatype engine (DTE) module 520, and a direct memory access (DMA) module 530.

MCU module 510 can include a Request (Req) command processor 512, a transmit queue 516, and a Response (Resp) command processor 514. DTE module 520 can include: a Get Request (GRQ) engine 525; a Put Request (PRQ) engine 526 and an issuer 527 (in the DTE stage for issuing Put Requests to DMA module 530); a Get Response (GRS) engine 528 and an issuer 529 (in the DTE stage for issuing Get Responses to DMA module 530); and a shared descriptor storage including a non-byte-mask descriptor storage 522 and a byte-mask-descriptor storage 524. DMA module 530 can include: a Request buffer (Req MDB) 532; a Response buffer (Resp MDB) 534; an issuer 538 (in the DMA stage for handling Requests); an issuer 539 (in the DMA stage for handling Responses); an arbitrator (ARB) 540; an address translation (ATR) module 542; an interface MDR1 544; an interface MDR0 546; and a compaction module 536.

MCU module 510 can be split into Request (Req) and Response (Resp) pipelines. Each individual message chopping unit in MCU module 510 can manage a command through the process of constructing the packet header and collecting the payload packet. When MCU module 510 manages a command in which the message payload is defined by a datatype (e.g., where the command indicates a datatype descriptor stored in the NIC), MCU module 510 can pass a DMA instruction per packet to DTE module 520. DTE module 520 can process the datatype descriptor to generate a corresponding DMA instruction which obtains the packet payload from the host memory (as described above in relation to DTE module 304, DMA module 306, ATU 310, and host memory 312 of FIG. 3, including communications 336, 338, 340, 342, and 344).

Two similar interfaces between MCU module 510 and DTE module 520 can exist: one to handle the Request pipeline (e.g., via Request command processor 512); and one to handle the Response pipeline (e.g., via Response command processor 514). The Request pipeline can include multiple MCUs which manage commands from the command queue (e.g., Put Requests and Get Requests) as well as commands from a list-processing engine (LPE) (e.g., a Get request resulting from a Rendezvous Put Request). The Response pipeline can include multiple MCUs which process Put Response and Get Response commands received from an inbound packet engine (IXE). As Request command processor 512 processes a command from a given MCU or as Response command processor 514 processes a Get Response command, processors 512/514 can pass an instruction to DTE module 520 for datatype processing.

During operation, a user may create a datatype (e.g., a multi-dimensional array structure) which is sent by a transmit queue 516 to be stored in non-byte-mask descriptor 522 (via a communication 561). In the Request pipeline, Request command processor 512 can send a command which does not indicate a datatype descriptor directly to issuer 538 of DMA module 530 (via a communication 573). Request command processor 512 can also send a command which does indicate a datatype descriptor to DTE module 520, to either GRQ engine 525 (via a communication 562) or to PRQ engine 526 (via a communication 563). GRQ engine 525 and PRQ engine 526 can obtain the indicated datatype descriptor from non-byte-mask descriptor storage 522 (via, respectively, communications 565 and 566). GRQ engine 525 can pre-process the datatype descriptor and store starting context for a subsequent Get Response packet in Request MDB 532 (via a communication 568). The context is stored in a structure, and when the corresponding Get Response packet arrives, the context is attached to the Get Response packet and provided to the DTE in the inbound transfer engine. PRQ engine 526 can send a set of DMA commands to issuer 527 (via a communication 570).

In the Response pipeline, Response command processor 514 can send a command which does not indicate a datatype descriptor directly to issuer 539 of DMA module 530 (via a communication 576). Response command processor 514 can also send a command which does indicate a datatype descriptor to DTE module 520, to GRS engine 528 (via a communication 564), which can obtain the indicated datatype descriptor from non-byte-mask descriptor storage 522 (via a communication 567). GRS engine 528 can send a set of DMA commands to issuer 529.

In DMA module 530 (in either the Request or Response pipeline), ARB 540 can receive DMA commands from issuer 538, 527, 529, and/or 539 (via, respectively, communications 577, 578, 579, and/or 580). ARB 540 can send a command to ATR 542 for address translation (via a communication 581), which can involve sending a virtual address to and receiving a physical address from ATU 550 (via a communication 580). DMA module 530 can include two interfaces to a host memory 552. The first interface can be managed by an MDR0 546 and used for packet payload DMA reads (via a communication 589). The second interface can be managed by an MDR1 544 and used for low-latency DMA reads using the CXL.cache protocol (if available) (via a communication 586). DTE module 520 can use interface MDR1 544 to fetch IOVEC entries and other information (via a communication 569). ATR 542 can send the physical address to MDR1 544 (via a communication 585), which can retrieve the data at the given physical address from host memory 552 (via communication 586). ATR 542 can also send the physical address to MDR0 546 (via a communication 584), which can retrieve the data at the given physical address from host memory 552 (via communication 589).

When DTE module 520 passes a DMA command to DMA module 530, the command can include a bit which can be used after ATR 542 to determine which MDR is to manage the DMA request. For example, DMA responses which are managed by MDR1 544 (for IOVEC entries and other information) can be routed back up to DTE module 520 (via communications 569 and 571), while DMA responses which are managed by MDR0 546 can be routed to one of the packet buffers (532 and 534) via compaction module 536. DMA commands which are generated by DTE module 520 can include information which indicates whether compaction needs to be performed, along with the datatype descriptor. This information can determine the byte-mask to use for compaction. For example, MDR0 546 can send a packet to compaction module 536 (via a communication 588), and if the packet indicates that compaction is to be performed, compaction module 536 can obtain the appropriate byte-mask from byte-mask descriptor storage 524 (via a communication 590). Compaction module 536 can use the obtained byte-mask to compress out invalid bytes of the DMA response data, as described below. Note that while byte-mask descriptor storage 524 is depicted as logically located in DTE module 520, it may be located physically near the compaction logic performed by compaction module 536 in DMA module 530. The given data (compacted where necessary) can be sent to the appropriate packet buffer, e.g., to Request buffer 532 or Response buffer 534 (via, respectively, communications 583 and 587).

Detailed Description of Compaction Module

Recall that the size of an obtained byte-mask ("bit_mask_size") can be any number of bits and is not necessarily limited to a value of the power of 2 (such as 128, 256, of 512). The use of a 256-bit byte-mask is for illustrative purposes only. The compaction module described herein can scan the obtained bit_mask_size byte-mask and compact an arbitrary read of bit_mask_size bytes using the bit_mask_size byte-mask in a certain number of stages, i.e., log 2(bit_mask_size), rounding up as needed. For example: a 128-bit byte-mask would use log 2(128)=7 stages; a 129-bit byte-mask would use log 2(129)=8 stages (rounded up); and a 256-bit byte-mask would use log 2(256)=8 stages. As described above, if compaction is necessary, MDR0 546 can obtain the appropriate byte-mask from byte-mask descriptor storage 524, using the datatype descriptor (i.e., the datatype handle) provided in the information of the DMA request received from DTE module 520. In three cycles, the byte-mask and other information can be available from byte-mask descriptor storage 524. Compaction module 536 can scan the obtained 256-bit byte-mask and compact an arbitrary 256-byte read using the byte-mask in eight stages of 2:1 multiplexers. The information obtained from byte-mask storage descriptor 524 can include the 256-bit byte-mask along with seven pre-computed population counts. These population counts can be obtained from an inexpensive instruction known as POPCOUNT running on the host processor. A single cycle instruction can compute the number of valid bits in a 32-bit word. The population counts can be a progressive series of counts of ones in the byte-mask, from least significant bit to most significant bit, at 32-bit intervals. For example: the first pre-computed population count can be the number of ones in byte-mask[31:0]; the second pre-computed population count can be the number of ones in byte-mask[63:0]; etc. As a result, storing just seven of these results can result in simplifying the logic needed to compute the control bits for the eight stages of multiplexers.

When the byte-mask and pre-computed population counts are obtained from byte-mask descriptor storage 524, MDR0 546 can also output the DMA response data and various information used to align the data and eventually write the data into the target packet buffer (e.g., 532 or 534).

Figure 6:
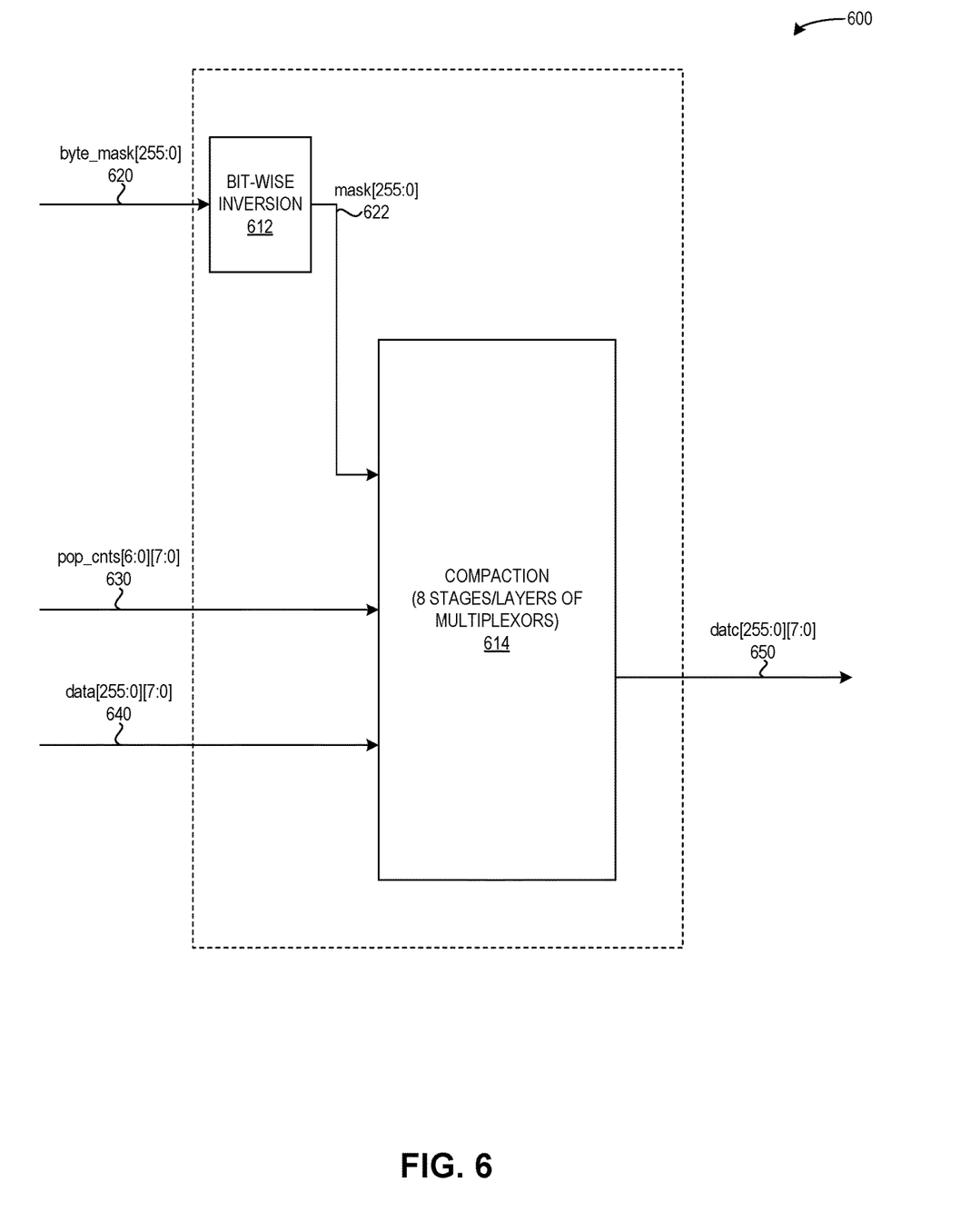
FIG. 6 illustrates a diagram depicting a high-level view of a compaction module, in accordance with an aspect of the present application.

FIG. 6 illustrates a diagram 600 depicting a high-level view of a compaction module, in accordance with an aspect of the present application. Diagram 600 can represent a module or modules of a network interface card (NIC), e.g., a portion of an outbound packet engine in NIC. The NIC module(s) can include a bit-wise inversion module 612 and a compaction module 614 (which can correspond to compaction module 536 of FIG. 5). The obtained 256-bit byte-mask can be referred to as a "byte_mask" and can be indicated as "byte_mask[255:0] 620." Byte_mask 620 can include one bit corresponding to each byte of the 256-byte data to be compacted. The data to be compacted can include up to 256 bytes and can be indicated as "data[255:0][7:0] 640," where the first element indicates the byte number (of 256) and the second element indicates the bits within each byte of data.

Byte_mask 620 can be bit-wise inverted in the NIC by bit-wise inversion module 612 for input to layer 1 parity logic. There is no hardware cost for this inversion, as the result can be some XNOR gates in the layer 1 parity logic instead of XOR gates. While there is no hardware cost, this invention can also be performed by software instead (i.e., software can pre-invert the byte-mask). Thus, byte_mask [255:0] 620 can be bit-wise inverted by bit-wise inversion module 612 (or software) to output a "mask[255:0] 622."

Furthermore, "pop_cnts[x]" can indicate the seven population counts calculated by software and provided with byte_mask 620 and data 640 into compaction module 614. That is: pop_cnts[0] can indicate a count of the zeros in byte_mask[31:0]; pop_cnts[1] can indicate a count of the zeros in byte_mask[63:0]; pop_cnts[2] can indicate a count of the zeros in byte_mask[95:0]; pop_cnts[3] can indicate a count of the zeros in byte_mask[127:0]; pop_cnts[4] can indicate a count of the zeros in byte_mask[159:0]; pop_cnts [5] can indicate a count of the zeros in byte_mask[191:0]; and pop_cnts[6] can indicate a count of the zeros in byte_mask[223:0]. This can be indicated by a "pop_cnts[6: 0][7:0] 630," where the first element indicates the population count (of 7) and the second element indicates the bit location within that count value. Thus, in the example of the 256-bit byte mask, the POPCNT instruction can be called 7 times and summed up as partial results.

Compaction module 614 can take as input the following information: mask[255:0] 622; pop_cnts[6:0][7:0] 630; and data[255:0][7:0] 640. Compaction module 614 can perform eight stages/layers of compaction using 2:1 multiplexers, as described below. Upon completion of the eight stages/layers of multiplexers (i.e., Layers 1-8), compaction module 614 can output the compacted data, which is indicated as "datc [255:0][7:0] 650."

In Layer 1, each multiplexer can select from: data[i] or data[i+1] (where data[i+1] is zero for i>255); and mask[i] or mask[i+1] (where mask[i+1] is zero for i>255). That is, the data and mask are compacted together. The control for multiplexor[i] in layer 1 is labeled sel0[i]. Compaction module 536 can generate the 256 multiplexer control bits based on the following: every control bit for which (i %32)==0 and i>0 can be obtained directly from the pre-computed pop_cnts bit (e.g., pop_cnts[0][0] can be the value for "sel0[32]", and pop_cnts[1][0] can be the value for "sel0[64]"); and all other control bits can be an XOR of mask[i] and sel0[i−1] (where the control bit sel0[i] can be set to mask[i] when i<1). Thus, the Layer 1 outputs can be dat1[255:0][7:0] and msk1[255:0]. The value of pop_cnts travels alongside the data without modification.

In Layer 2, each multiplexer can select from the Layer 1 outputs: dat1[i] or dat1[i+2] (where dat1[i+2] is zero for i>253); and msk1[i] or msk1[i+2] (where msk1[i+2] is zero for i>253). For the 256 control bits: every control bit for which (i %32)==31 and i<224 can be obtained directly from the pre-computed pop_cnts bit (e.g., pop_cnts[0][1] can be the value for "sel1[31]", and pop_cnts[1][1] can be the value for "sel1[63]"). Note that the bit position taken from each pop_cnt has increased by 1. The location where the pop_cnts are applied has shifted by the shift size in the prior stage. All other control bits can be an XOR of msk1[i] and sel1[i−2] (where the control bit sel1[i] can be set to msk1[i] when i<2). Thus, the Layer 2 outputs can be dat2[255:0][7:0] and msk2[255:0].

In Layer 3, each multiplexer can select from the Layer 2 outputs: dat2[i] or dat2[i+4] (where dat2[i+4] is zero for i>251); and msk2[i] and msk2[i+4] (where msk2[i+4] is zero for i>251). For the 256 control bits: every control bit for which (i %32)==29 and i<222 can be obtained directly from the pre-computed pop_cnts bit (e.g., pop_cnts[0][2] can be the value for "sel2[29]", and pop_cnts[2][2] can be the value for "sel2[93]"); and all other control bits can be an XOR of msk2[i] and sel2[i−4] (where the control bit sel2[i] can be set to msk2[i] when i<4). Thus, the Layer 3 outputs can be dat3[255:0][7:0] and msk3[255:0].

In Layer 4, each multiplexer can select from the Layer 3 outputs: dat3[i] or dat3[i+8] (where dat3[i+8] is zero for i>247); and msk3[i] or msk3[i+8] (where msk3[i+8] is zero for i>247). For the 256 control bits: every control bit for which (i %32)==25 and i<218 can be obtained directly from the pre-computed pop_cnts bit (e.g., pop_cnts[0][3] can be the value for "sel3[25]", and pop_cnts[3][3] can be the value for "sel3[121]"); and all other control bits can be an XOR of msk3[i] and sel3[i−8] (where the control bit sel3[i] can be set to msk3[i] when i<8). Thus, the Layer 4 outputs can be dat4[255:0][7:0] and msk4[255:0].

In Layer 5, each multiplexer can select from the Layer 4 outputs: dat4[i] or dat4[i+16] (where dat4[i+16] is zero for i>239); and msk4[i] or msk4[i+16] (where msk4[i+16] is zero for i>239). For the 256 control bits: every control bit for which (i %32)==17 and i<210 can be obtained directly from the pre-computed pop_cnts bit (e.g., pop_cnts[0][4] can be the value for "sel4[17]", and pop_cnts[4][4] can be the value for "sel4[145]"); and all other control bits can be an XOR of msk4[i] and sel4[i−16] (where the control bit sel4[i] can be set to msk4[i] when i<16). Thus, the Layer 5 outputs can be dat5[255:0][7:0] and msk5[255:0].

In Layer 6, each multiplexer can select from the Layer 5 outputs: dat5[i] or dat5[i+32] (where dat5[i+32] is zero for i>223); and msk5[i] or msk5[i+32] (where msk5[i+32] is zero for i>223). For the 256 control bits: every control bit for which (i %32)==1 and i<194 can be obtained directly from the pre-computed pop_cnts bit (e.g., pop_cnts[0][5] can be the value for "sel5[1]", and pop_cnts[5][5] can be the value for "sel5[161]"); and all other control bits can be an XOR of msk5[i] and sel5[i−32] (where the control bit sel5[i] can be set to msk5[i] when i<32). Thus, the Layer 6 outputs can be dat6[255:0][7:0] and msk6[255:0].

In Layer 7, each multiplexer can select from the Layer 6 outputs: dat6[i] or dat6[i+64] (where dat6[i+64] is zero for i>191); and msk6[i] or msk6[i+64] (where msk6[i+64] is zero for i>191). For the 256 control bits: every control bit for which (i %32)==1 and i<162 can be obtained directly from the pre-computed pop_cnts bit (e.g., pop_cnts[1][6] can be the value of "sel6[1]", and pop_cnts[6][6] can be the value for "sel6[161]"); and all other control bits can be an XOR of msk6[i] and sel6[i−64] (where the control bit sel6[i] can be set to msk6[i] when i<64). Thus, the Layer 7 outputs can be dat7[255:0][7:0] and msk7[255:0].

In Layer 8, each multiplexer can select from the Layer 7 outputs: dat7[i] or dat7[i+128] (where dat7[i+128] is zero for i>127). For the 256 control bits: every control bit for which (i %32)==1 and i<98 can be obtained directly from the pre-computed pop_cnts bit (e.g., pop_cnts[4][7] can be the value for "sel7[33]" and pop_cnts[5][7] can be the value for "sel7[65]"); and all other control bits can be an XOR of msk7[i] and sel7[i−128] (where the control bit sel7[i] can be set to msk7[i] when i<128). Thus, the Layer 8 outputs can be the compacted data, i.e., datc[255:0][7:0] 650 as shown in FIG. 6.

Compaction module 614 of the NIC can thus perform inline compaction by taking as input an inversion of the 256-bit byte-mask, the seven population counts for 7×32-bit portions of the byte-mask, and up to 256 bytes of data, performing the eight stages of compaction using 2:1 multiplexers, and outputting the compacted data. By performing the inline (i.e., "on-the-fly") compaction within the hardware, the described aspects can provide more efficient transfers across a host interface (e.g., a PCIe bus).

Figure 7:
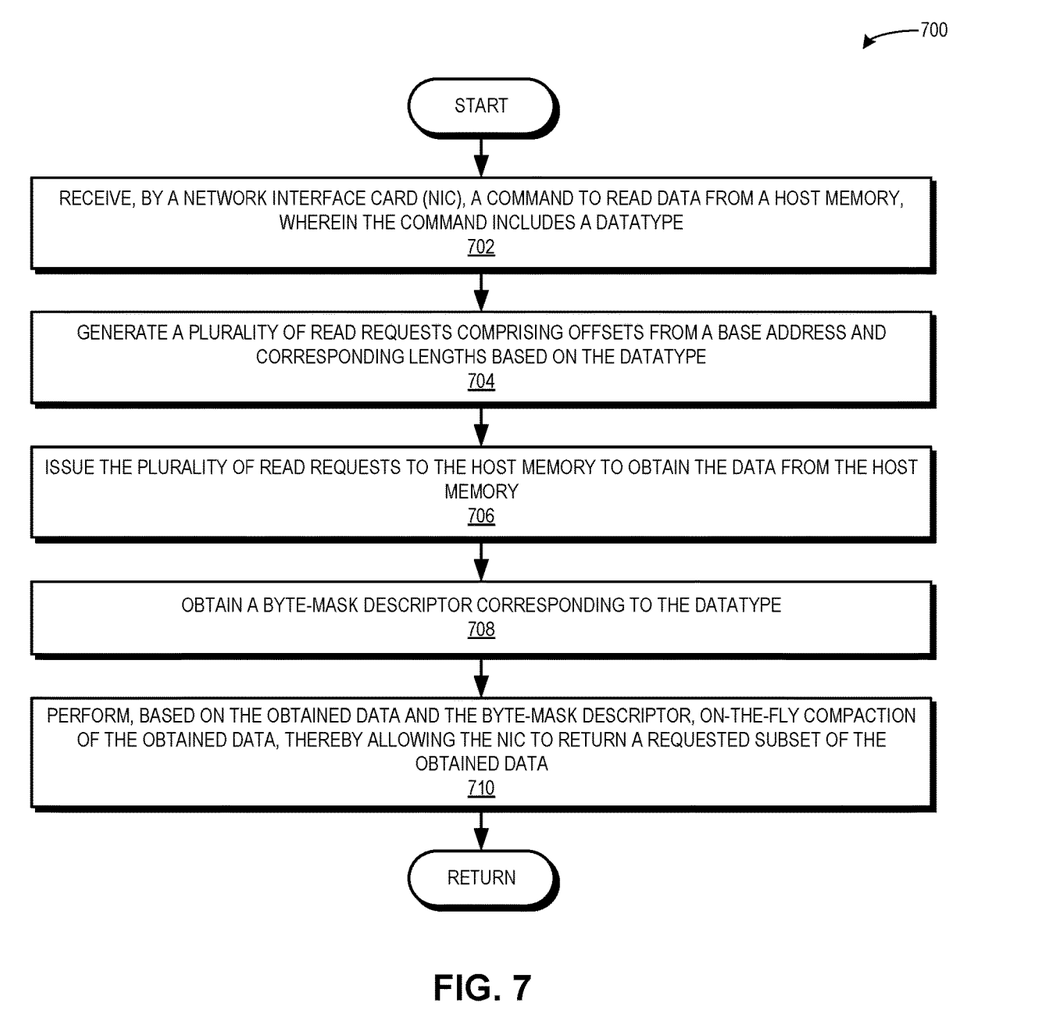
FIG. 7 presents a flowchart illustrating a method which facilitates data structures for a datatype engine and provides inline compaction, in accordance with an aspect of the present application.

Method Which Facilitates Data Structures for a Datatype Engine and Provides Inline Compaction FIG. 7 presents a flowchart 700 illustrating a method which facilitates data structures for a datatype engine and provides inline compaction, in accordance with an aspect of the present application. During operation, the system receives, by a network interface card (NIC), a command to read data from a host memory, wherein the command indicates a datatype (operation 702). The system generates a plurality of read requests comprising offsets from a base address and corresponding lengths based on the datatype (operation 704). The system issues the plurality of read requests to a host memory to obtain the data from the host memory (operation 706). The system obtains a byte-mask descriptor corresponding to the datatype (operation 708). The system performs, based on the obtained data and the byte-mask descriptor, on-the-fly compaction of the obtained data, thereby allowing the NIC to return a requested subset of the obtained data (operation 710).

Figure 8:
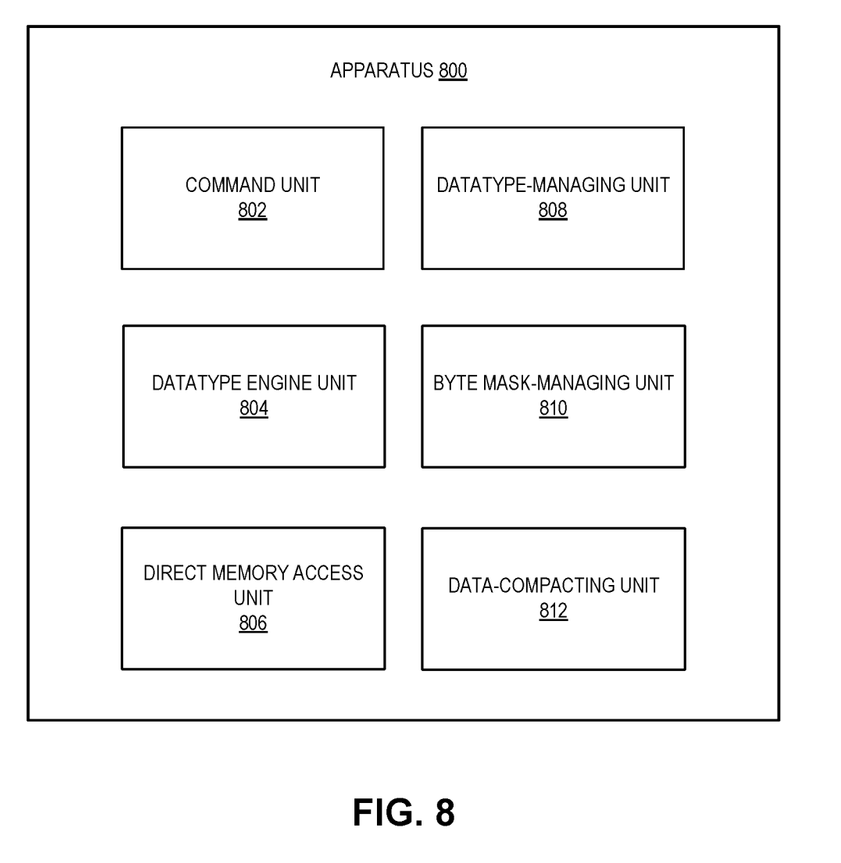
FIG. 8 illustrates an apparatus which facilitates data structures for a datatype engine and provides inline compaction, in accordance with an aspect of the present application.

Apparatus Which Facilitates Data Structures for a Datatype Engine and Provides Inline Compaction FIG. 8 illustrates an apparatus 800 which facilitates data structures for a datatype engine and provides inline compaction, in accordance with an aspect of the present application. Apparatus 800 can represent a network interface card (NIC) and can include: a command unit 802 to receive a command to read data from a host memory, where the command indicates a datatype; a datatype-managing unit 808 to manage and store datatypes (i.e., datatype descriptors) in the NIC; a datatype engine unit 804 to generate a plurality of read requests comprising offsets from a base address and corresponding lengths based on the datatype; a direct memory access unit 806 to issue the plurality of read requests to the host memory to obtain the data from the host memory; a byte-mask-managing unit 810 to obtain a byte-mask descriptor corresponding to the datatype and to perform bit-wise inversion in the NIC; and a data-compacting unit 812 to perform, based on the obtained data and the byte-mask descriptor, on-the-fly compaction of the obtained data, thereby allowing the NIC to return a requested subset of the obtained data.

Datatype engine unit 804 can correspond to DTE module 520 of FIG. 5. Direct memory access unit 806 can correspond to DMA module 530 of FIG. 5. Datatype-managing unit 808 can correspond to non-byte-mask descriptor storage 522 of FIG. 5, and byte-mask-managing unit 810 can correspond to byte-mask descriptor storage 524 of FIG. 5. Data-compacting unit 812 can correspond to compaction module 536 of FIG. 5 and compaction module 614 of FIG. 6, and can perform the operations described herein. Thus, the units described as part of apparatus 800 may perform the operations described above in relation to FIGS. 5 and 6.

In general, the disclosed aspects provide a system, method, apparatus, and non-transitory storage medium for facilitating data structures for a datatype engine and provide inline compaction. In one aspect, the system receives, by a network interface card (NIC), a command to read data from a host memory, wherein the command indicates a datatype. The system generates a plurality of read requests comprising offsets from a base address and corresponding lengths based on the datatype. The system issues the plurality of read requests to the host memory to obtain the data from the host memory. The system obtains a byte-mask descriptor corresponding to the datatype. The system performs, based on the obtained data and the byte-mask descriptor, on-the-fly compaction of the obtained data, thereby allowing the NIC to return a requested subset of the obtained data.

In a variation on this aspect, a datatype engine of the NIC generates the plurality of read requests and transmits the plurality of read requests to a direct memory access module of the NIC. The direct memory access module of the NIC receives the plurality of read requests, issues the plurality of read requests to the host memory, obtains the data from the host memory, and sends the obtained data to a compaction module of the NIC. The compaction module of the NIC receives the obtained data and the byte-mask descriptor corresponding to the datatype and performs the on-the-fly compaction of the obtained data.

In a further variation on this aspect, the system performs the on-the-fly compaction to obtain compacted data. The system sends the compacted data to a packet buffer of the direct memory access module which handles responses and returns the compacted data in response to the command.

In a further variation, the system performs the on-the-fly compaction of the obtained data by processing the obtained data from the host memory using a first number of layers (e.g., 8) of multiplexers and an inversion of the byte-mask descriptor wherein the first number of layers is based on a logarithmic function of a number of bits (e.g., 256) in the byte-mask. Multiplexers in each layer select from a pair of data bytes and a pair of mask bits in an increasing sequence based on a control bit which is generated based on a second number population counts, wherein the second number (e.g., 7) is associated with the first number (e.g., 8).

In a further variation, the second number of population counts are generated based on a software instruction. A respective population count indicates a number of zeros in the inversion of the byte-mask descriptor and corresponds to 32 bits in the obtained byte-mask descriptor.

In a further variation, the byte-mask descriptor comprises a number of bits (e.g., 256) which each indicate whether a corresponding byte of the obtained data is to be kept or compressed out.

In a further variation, the datatype indicates a data structure comprising a multi-dimensional array which includes: a number of elements in each dimension; a size of a block to be transferred; and a stride in each dimension.

In a further variation, the system unrolls a loop corresponding to the multi-dimensional array such that a total amount of data to be read by an unrolled loop is up to a predetermined number of bytes (e.g., 256) in length.

In a further variation, the byte-mask descriptor is stored in a shared storage space, and descriptors of datatypes, including a first descriptor of the datatype indicated in the command, are stored in the shared storage space.

Another aspect provides a network interface card (NIC). The NIC comprises a command module to receive a command to read data from a host memory, wherein the command indicates a datatype. The NIC further comprises a datatype engine module to generate a plurality of read requests comprising offsets from a base address and corresponding lengths based on the datatype. The NIC also comprises a direct memory access module to issue the plurality of read requests to the host memory to obtain the data from the host memory. The NIC further comprises a byte-mask-managing module to obtain a byte-mask descriptor corresponding to the datatype. The NIC also comprises a data-compacting module to perform, based on the obtained data and the byte-mask descriptor, on-the-fly compaction of the obtained data, thereby allowing the NIC to return a requested subset of the obtained data.

Yet another aspect provides a non-transitory computer-readable storage medium storing instructions that when executed by a computer cause the computer to perform a method, the method as described above and herein.

The foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:
1. A computer-implemented method, comprising:
receiving, by a network interface card (NIC), a command to read data from a host memory, wherein the command indicates a datatype;
generating a plurality of read requests comprising offsets from a base address and corresponding lengths based on the datatype;
issuing the plurality of read requests to the host memory to obtain the data from the host memory;
obtaining a byte-mask descriptor corresponding to the datatype; and
performing, based on the obtained data and the byte-mask descriptor, on-the-fly compaction of the obtained data, thereby allowing the NIC to return a requested subset of the obtained data.

2. The method of claim 1,
wherein a datatype engine of the NIC generates the plurality of read requests and transmits the plurality of read requests to a direct memory access module of the NIC,
wherein the direct memory access module of the NIC receives the plurality of read requests, issues the plurality of read requests to the host memory, obtains the data from the host memory, and sends the obtained data to a compaction module of the NIC, and
wherein the compaction module of the NIC receives the obtained data and the byte-mask descriptor corresponding to the datatype and performs the on-the-fly compaction of the obtained data.

3. The method of claim 1, wherein performing the on-the-fly compaction is to obtain compacted data, and wherein the method further comprises:
sending the compacted data to a packet buffer of the direct memory access module which handles responses; and
returning the compacted data in response to the command.

4. The method of claim 1, wherein performing the on-the-fly compaction of the obtained data comprises:
processing the obtained data from the host memory using a first number of layers of multiplexers and an inversion of the byte-mask descriptor, wherein the first number of layers is based on a logarithmic function of a number of bits in the byte-mask,
wherein multiplexers in each layer select from a pair of data bytes and a pair of mask bits in an increasing sequence based on a control bit which is generated based on a second number of population counts, wherein the second number is associated with the first number.

5. The method of claim 4,
wherein the second number of population counts are generated based on a software instruction, and
wherein a respective population count indicates a number of zeros in the inversion of the byte-mask descriptor and corresponds to 32 bits in the obtained byte-mask descriptor.

6. The method of claim 1,
wherein the byte-mask descriptor comprises a number of bits which each indicate whether a corresponding byte of the obtained data is to be kept or compressed out.

7. The method of claim 1,
wherein the datatype indicates a data structure comprising a multi-dimensional array which includes:
a number of elements in each dimension;
a size of a block to be transferred; and
a stride in each dimension.

8. The method of claim 7, further comprising:
unrolling a loop corresponding to the multi-dimensional array such that a total amount of data to be read by an unrolled loop is up to a predetermined number of bytes in length.

9. The method of claim 1,
wherein the byte-mask descriptor is stored in a shared storage space, and
wherein descriptors of datatypes, including a first descriptor of the datatype indicated in the command, are stored in the shared storage space.

10. A network interface card, comprising:
a command module to receive a command to read data from a host memory, wherein the command indicates a datatype;
a datatype engine module to generate a plurality of read requests comprising offsets from a base address and corresponding lengths based on the datatype;
a direct memory access module to issue the plurality of read requests to the host memory to obtain the data from the host memory;
a byte-mask-managing module to obtain a byte-mask descriptor corresponding to the datatype; and
a data-compacting module to perform, based on the obtained data and the byte-mask descriptor, on-the-fly compaction of the obtained data, thereby allowing the NIC to return a requested subset of the obtained data.

11. The network interface card of claim 10,
wherein the datatype engine module is further to transmit the plurality of read requests to a direct memory access module of the NIC,
wherein the direct memory access module is further to receive the plurality of read requests prior to issuing the plurality of read requests to the host memory, obtain the data from the host memory, and send the obtained data to the data-compacting module, and
wherein the data-compacting module is further to receive the obtained data and the byte-mask descriptor corresponding to the datatype.

12. The network interface card of claim 10,
wherein the data-compacting module is further to obtain compacted data by performing the on-the-fly compaction and send the compacted data to a packet buffer of the direct memory access module which handles responses; and
wherein the direct memory access module is further to return the compacted data in response to the command.

13. The network interface card of claim 10, wherein the data-compacting module performs the on-the-fly compaction of the obtained data by:
processing the obtained data from the host memory using a first number of layers of multiplexers and an inversion of the byte-mask descriptor, wherein the first number of layers is based on a logarithmic function of a number of bits in the byte-mask,
wherein multiplexers in each layer select from a pair of data bytes and a pair of mask bits in an increasing sequence based on a control bit which is generated based on a second number of population counts, wherein the second number is associated with the first number,
wherein the second number of population counts are generated based on a software instruction, and
wherein a respective population count indicates a number of zeros in the inversion of the byte-mask descriptor and corresponds to 32 bits in the obtained byte-mask descriptor.

14. The network interface card of claim 10,
wherein the byte-mask descriptor comprises a number of bits, wherein a respective bit indicates whether a corresponding byte of the obtained data is to be kept or compressed out.

15. The network interface card of claim 10,
wherein the datatype indicates a data structure comprising a multi-dimensional array which includes:
a number of elements in each dimension;
a size of a block to be transferred; and
a stride in each dimension.

16. The network interface card of claim 15,
wherein the datatype engine module is further to unroll a loop corresponding to the multi-dimensional array such that a total amount of data to be read by an unrolled loop is up to a predetermined number of bytes in length.

17. The network interface card of claim 10,
wherein the byte-mask descriptor and datatype descriptors are stored in a shared storage space of the network interface card.

18. A non-transitory computer-readable storage medium storing instructions that when executed by a computer cause the computer to perform a method, the method comprising:
storing, by a datatype engine unit of a network interface card, one or more datatype descriptors created by a user associated with the computer;
receiving, by the NIC, a command to read data from a host memory, wherein the command indicates a datatype descriptor;
generating, by the datatype engine unit, a plurality of read requests comprising offsets from a base address and corresponding lengths based on the datatype;
issuing, by a direct memory access unit of the NIC, the plurality of read requests to the host memory to obtain the data from the host memory;
obtaining, by a data-compacting unit of the NIC, a byte-mask descriptor corresponding to the datatype; and
performing, by the data-compacting unit based on the obtained data and the byte-mask descriptor, on-the-fly compaction of the obtained data, thereby allowing the NIC to return a requested subset of the obtained data.

19. The non-transitory computer-readable storage medium of claim 18,
wherein the byte-mask descriptor comprises a first number of bits which each indicate whether a corresponding byte of the obtained data is to be handled in a first manner or a second manner, and wherein the data-compacting unit performs the on-the-fly compaction of the obtained data by:
processing the obtained data from the host memory using a second number of layers of multiplexers and an inversion of the byte-mask descriptor, wherein the second number of layers is based on a logarithmic function of the first number of bits in the byte-mask,
wherein multiplexers in each layer select from a pair of data bytes and a pair of mask bits in an increasing sequence based on a control bit which is generated based on a third number of population counts,
wherein the third number of population counts are generated based on a software instruction, and
wherein a respective population count indicates a number of zeros in the inversion of the byte-mask descriptor and corresponds to 32 bits in the obtained byte-mask descriptor.

20. The non-transitory computer-readable storage medium of claim 19, wherein the first manner and the second manner comprise at least one of:
keeping the corresponding byte;
compressing out the corresponding byte; and
performing a predetermined action for the corresponding byte.

\* \* \* \* \*